(12) United States Patent
Matsui et al.

(10) Patent No.: US 8,148,017 B2
(45) Date of Patent: Apr. 3, 2012

(54) ELECTROCHEMICAL ENERGY STORAGE DEVICE

(75) Inventors: Tooru Matsui, Osaka (JP); Masaki Deguchi, Hyogo (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 811 days.

(21) Appl. No.: 12/159,820

(22) PCT Filed: Mar. 1, 2007

(86) PCT No.: PCT/JP2007/053911
§ 371 (c)(1),
(2), (4) Date: Jul. 1, 2008

(87) PCT Pub. No.: WO2007/125682
PCT Pub. Date: Nov. 8, 2007

(65) Prior Publication Data
US 2009/0176164 A1 Jul. 9, 2009

(30) Foreign Application Priority Data
Apr. 28, 2006 (JP) .................................. 2006-125179

(51) Int. Cl.
*H01M 4/58* (2010.01)

(52) U.S. Cl. ...................... 429/231.8; 429/201; 429/330; 429/331; 429/332; 429/338; 429/342; 429/322; 429/323

(58) Field of Classification Search ................... 429/201, 429/330, 331, 332, 338, 342, 322, 323, 231.8
See application file for complete search history.

(56) References Cited

U.S. PATENT DOCUMENTS

| 7,879,489 B2 * | 2/2011 | Deguchi et al. ............... 429/199 |
| 2003/0157412 A1 | 8/2003 | Yamaguchi et al. |
| 2005/0158623 A1 | 7/2005 | Matsui et al. |

FOREIGN PATENT DOCUMENTS

| JP | 11-329490 | * 11/1999 |
| JP | 2000-228222 | * 8/2000 |
| JP | 2002-110228 | 4/2002 |
| JP | 2003-197254 | 7/2003 |
| JP | 2004-6803 | 1/2004 |
| JP | 2005-229103 | 8/2005 |
| JP | 2005-353652 | 12/2005 |
| WO | WO 2006/123601 A1 | 11/2006 |

OTHER PUBLICATIONS

Denkikagaku Binran (Handbook of Electrochemistry) p. 119, Table 3.32 (a), 5th edition, 2000.

* cited by examiner

*Primary Examiner* — Laura Weiner
(74) *Attorney, Agent, or Firm* — McDermott Will & Emery LLP

(57) ABSTRACT

An electrochemical energy storage device includes a negative electrode which contains a carbon material and has a negative electrode potential of 1.4 V or less relative to a lithium reference when being charged, and a non-aqueous electrolyte solution prepared by dissolving a lithium salt, an ammonium salt, and at least one kind of fluorinated benzene selected among hexafluorobenzene, pentafluorobenzene, 1,2,3,4-tetrafluorobenzene, 1,2,3,5-tetrafluorobenzene, 1,2,4,5-tetrafluorobenzene and 1,2,3-trifluorobenzene, in a non-aqueous solvent.

9 Claims, 3 Drawing Sheets

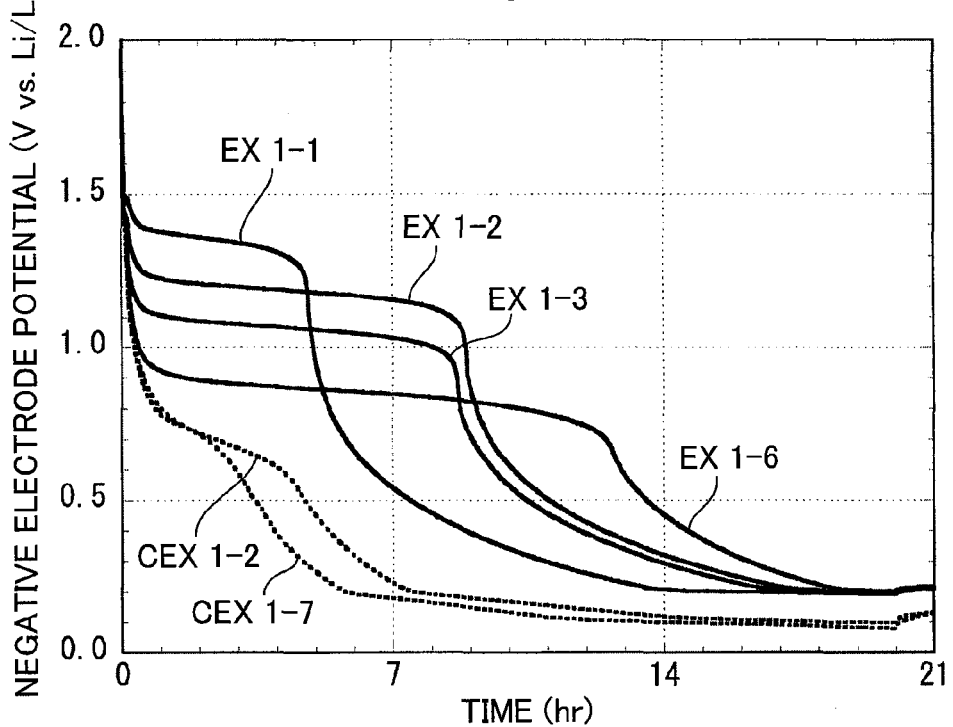
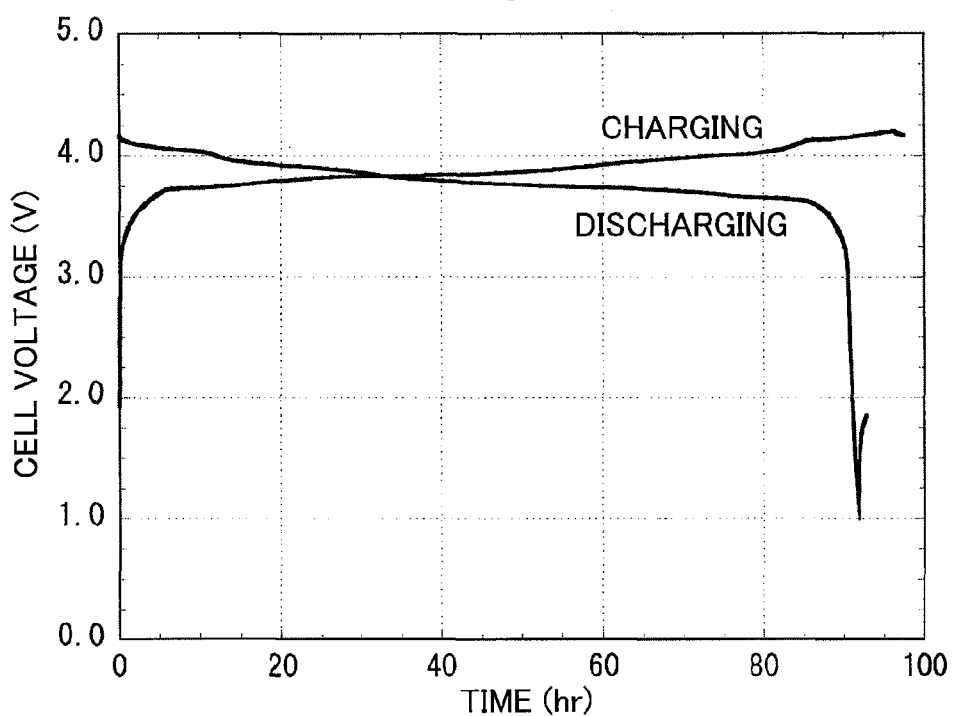

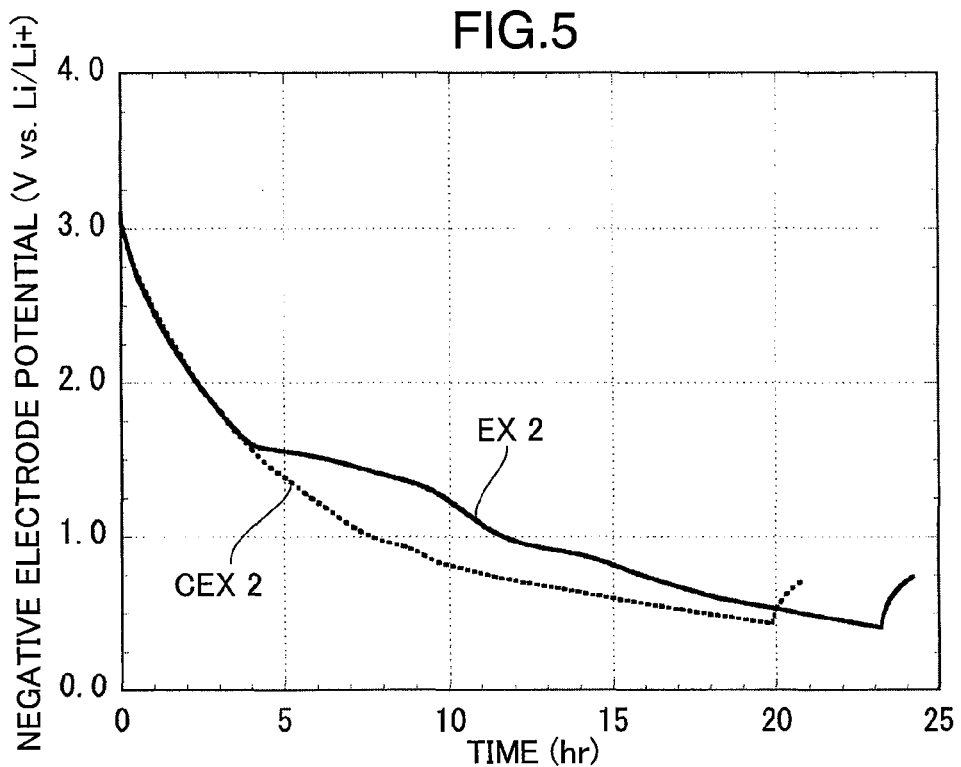
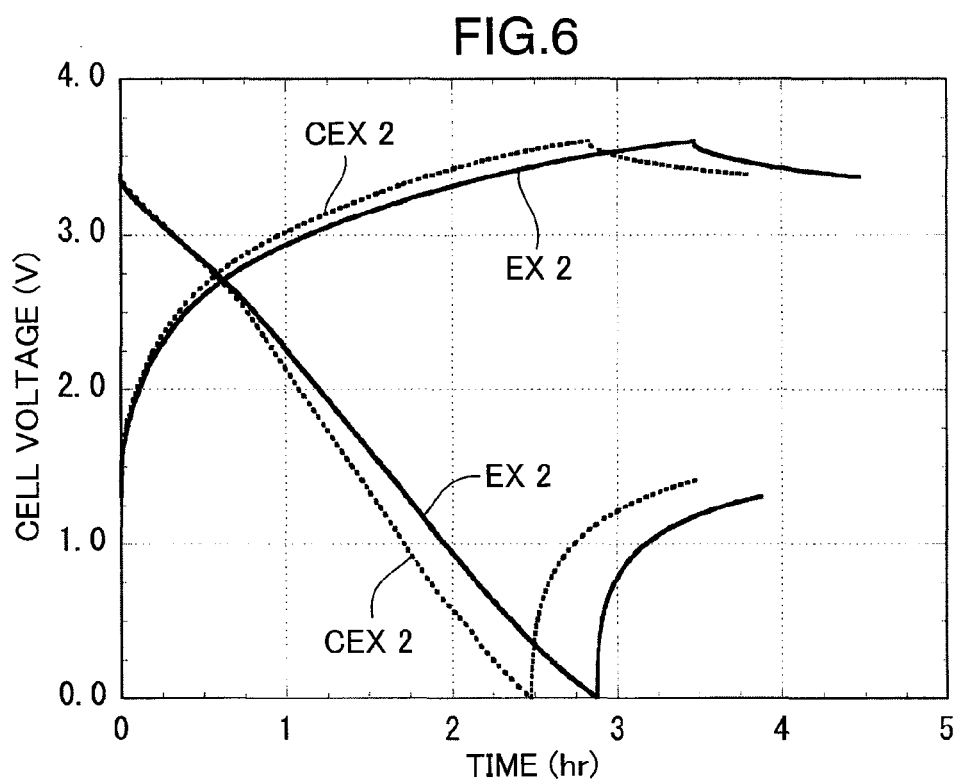

US 8,148,017 B2

ELECTROCHEMICAL ENERGY STORAGE DEVICE

RELATED APPLICATIONS

This application is the U.S. National Phase under 35 U.S.C. §371 of International Application No. PCT/JP2007/053911, filed on Mar. 1, 2007, which in turn claims the benefit of Japanese Application No. 2006-125179, filed on Apr. 28, 2006, the disclosures of which Applications are incorporated by reference herein.

TECHNICAL FIELD

The present invention relates to an electrochemical energy storage device, and particularly to an improvement in a non-aqueous electrolyte solution for the device.

BACKGROUND ART

In an electric double layer capacitor in which a polarizable electrode is used as a positive electrode and a negative electrode, electrochemical energy is stored by adsorbing cations and anions in a non-aqueous electrolyte solution on an electrode surface during a charging process. The energy density of the electric double layer capacitor is increased by two different methods. One method is to decrease the amount of the electrolyte solution by increasing the concentration of ions in the electrolyte solution, thereby relatively increasing the amount of the polarizable material. The other method is to allow a charging voltage to be set to a higher value by using a non-aqueous electrolyte solution. Namely, the use of the non-aqueous solvent for an electrolyte solution containing a supporting salt dissolved therein enables the setting of a high charging voltage on the electric double layer capacitor, and thus the energy density of the capacitor can be increased.

In a non-aqueous electrolyte battery in which a lithium ion conductive non-aqueous electrolyte solution is used, lithium ions move in the electrolyte solution between a positive electrode and a negative electrode. Regarding the non-aqueous electrolyte battery, the concentration of ions in the non-aqueous electrolyte solution does not vary during discharging in the case of a primary battery as well as during charging and discharging in the case of a secondary battery. Therefore, in order to increase the energy density of the non-aqueous electrolyte battery, the amount of the electrolyte solution is preferably decreased and the amount of the positive and negative electrode materials is preferably increased, as in the case of the electric double layer capacitor. While the amount of the electrolyte solution is decreased, the amount of ions capable of moving between the positive and negative electrodes must be maintained, and thus it is required to increase the concentration of lithium ions in the non-aqueous electrolyte solution. When a non-aqueous electrolyte solution prepared by dissolving a lithium salt such as $LiPF_6$ in a non-aqueous solvent is used in the non-aqueous electrolyte battery, it is possible to obtain a high charging voltage; By using a carbon material such as graphite as a negative electrode, the potential of the negative electrode can be made lower, and thus a high charging voltage can be also obtained in this respect.

Therefore, in order to achieve high energy density in any electrochemical energy storage device, it is necessary to use a non-aqueous electrolyte solution having a high concentration as the electrolyte solution. It is also necessary that the charging voltage should be made lower by using a negative electrode containing a carbon material such as activated carbon or graphite and an anti-reduction potential of the non-aqueous electrolyte solution should be synchronously made lower.

In an electric double layer capacitor, however, in which a carbon material such as activated carbon is used for a negative electrode, a decomposition of a non-aqueous electrolyte solution drastically proceeds on a surface of the activated carbon, when the capacitor is deeply charged. For example, in the case where ethylene carbonate (hereinafter abbreviated to EC) is used as a non-aqueous solvent, a gas such as hydrogen, ethylene, $CO_2$ or CO is produced due to the decomposition of EC when the potential of the negative electrode is about 1 V or less relative to a lithium reference. Therefore, in order to cause adsorption of ammonium ions and lithium ions in the non-aqueous electrolyte solution in a deeply charged state in the electric double layer capacitor, the decomposition of the electrolyte solution must be suppressed.

In the electric double layer capacitor and non-aqueous electrolyte battery described above, typical non-aqueous solvents used in the non-aqueous electrolyte solution include, for example, a cyclic carbonate such as EC, propylene carbonate (hereinafter abbreviated to PC), or butylene carbonate (hereinafter abbreviated to BC); a cyclic ester such as γ-butyrolactone (hereinafter abbreviated to γ-BL); and a chain carbonate such as dimethyl carbonate (hereinafter abbreviated to DMC), ethylmethyl carbonate (hereinafter abbreviated to EMC), or diethyl carbonate (hereinafter abbreviated to DEC). The non-aqueous electrolyte solution is prepared by dissolving a lithium salt such as lithium hexafluorophosphate ($LiPF_6$), lithium tetrafluoroborate ($LiBF_4$), lithium perchlorate ($LiClO_4$) or lithium bis[trifluoromethanesulfonyl]imide (hereinafter abbreviated to LiTFSI), and tetraethylammonium tetrafluoroborate (hereinafter abbreviated to $TEA.BF_4$) or triethylammonium tetrafluoroborate (hereinafter abbreviated to $TEMA.BF_4$) in the non-aqueous solvent. However, the concentration of the lithium salt to be dissolved in the non-aqueous electrolyte solution is usually no more than about 0.8 moles/kg. Also, even when a non-aqueous electrolyte solution having a high concentration is prepared, in view of solubility of the salts, the concentration is limited to 1:4 (2.2 moles/kg) in terms of a molar ratio in the case of an electrolyte solution containing $LiBF_4$ and EC, whereas the concentration is limited to 1:3 in case of an electrolyte solution containing $TEMA.BF_4$ and EC. Therefore, a non-aqueous electrolyte solution containing both a lithium and an ammonium salts at a high concentration is not obtained even now.

Referring to the supporting salt in the electrolyte solution, in the non-aqueous electrolyte solution of the electric double layer capacitor described above, an ammonium salt or a lithium salt is used as the supporting salt since electrochemical energy is stored owing to the adsorption of cations on the surface of activated carbon of the negative electrode side. On the other hand, in the non-aqueous electrolyte battery, since charging and discharging are conducted by allowing lithium ions to insert into and extract from the interlayers of the carbon material, such as graphite, of the negative electrode, a non-aqueous electrolyte solution containing a lithium salt dissolved therein is used. In the case where ammonium ions are present in the non-aqueous electrolyte solution, ammonium ions are more likely to insert into the interlayers of the carbon material than lithium ions. In the case where the content of ammonium ions is less than that of the lithium ions, it can be assumed that the insertion of a small amount of ammonium ions into the graphite interlayers expands the interlayer spaces to thereby increase the surface area. In the case where the non-aqueous electrolyte solution contains a high concentration of ammonium ions, however, the layer structure of graphite is broken, and thus the number of sites which contain lithium ions between layers decreases and also the decomposition of the ammonium ions arises. Therefore, in the non-aqueous electrolyte battery, it has been considered that the amount of the ammonium salt to be added to the non-aqueous electrolyte solution must be controlled to be smaller than that of the lithium salt. Thus, as the non-aqueous electrolyte solution for each electrochemical energy storage device, essentially different non-aqueous electrolyte solutions from each other or non-aqueous electrolyte solutions having a low concentration have been used. For example, Patent Document 1 proposes an electrolyte solution containing 0.5 to 2.5 moles/l of an ammonium salt and 0.5 to 2.0 moles/l of a lithium salt. Specifically, an electrolyte solution is prepared by dissolving $LiBF_4$ and $TEMA.BF_4$ each at a concentration of 1 mole/l in PC. When recalculated in terms of a molar ratio, $PC/LiBF_4$ is about 11/1 and $PC/TEMA.BF_4$ is about 10/1, and this electrolyte solution can hardly be a non-aqueous electrolyte solution having a high concentration.

There has recently been proposed a hybrid type electrochemical storage device in which a polarizable electrode in an electric double layer capacitor and a positive electrode and a negative electrode in a non-aqueous electrolyte battery are integrated, aiming to achieve both high rate characteristics and high capacity characteristics. In this type of device, for example, a mixed system of $LiCoO_2$ and activated carbon is used as a positive electrode material and a mixed system of graphite and activated carbon is used as a negative electrode material. Therefore, it is necessary to use a non-aqueous electrolyte solution containing both a lithium salt and an ammonium salt as supporting salts. As described above, however, even if a non-aqueous electrolyte solution containing a large amount of the ammonium salt is effective for activated carbon, it is unfavorable for graphite. Also, when deeply discharged, decomposition of the electrolyte solution arises on the surface of activated carbon.

In contrast, in a non-aqueous electrolyte battery, for example, Patent Document 2 discloses an electrolyte solution for a lithium ion battery containing a pentafluorobenzene derivative such as methyl pentafluorobenzenecarboxylate or trifluoromethylpentafluorobenzene. Patent Document 3 discloses an electrolyte solution for a lithium ion battery containing hexafluorobenzene. It has been considered that such fluorinated benzene forms a film having a high lithium ion permeability on the surface of a carbon material serving as a negative electrode, thereby enabling the insertion of lithium ions into the negative electrode material to suppress an irreversible reaction with the electrolyte solution.

However, any non-aqueous electrolyte solution described above has the composition of an electrolyte solution used in a conventional non-aqueous electrolyte battery in which a lithium salt is dissolved in a low concentration, and also there is no disclosure about the use in combination with an ammonium salt. Furthermore, it may be considered that if a film is formed of the above-mentioned fluorinated benzene, ammonium ions are prevented from inserting into graphite because the ionic radius of ammonium ions is larger than that of lithium ions. However, as a result of a comparison of limit molar conductivity of lithium ions, tetramethylammonium ions (hereinafter abbreviated to TMA ions), tetraethylammonium ions (hereinafter abbreviated to TEA ions) and tetrapropylammonium ions (hereinafter abbreviated to TPA ions) in PC and γ-BL, it has been confirmed that, regardless of lithium ions having an ionic radius smaller than those of TMA ions, TEA ions and TPA ions, the molar conductivity of lithium ions is less than those of these ammonium ions (Non-Patent Document 1). This fact suggests that lithium ions strongly attract neighboring solvent molecules because of their small size, allowing lithium ions to move in a solvated state, and also means that the ionic radius of lithium ions is substantially larger than that of ammonium ions. Therefore, it is rationally conceivable that not only lithium ions, but also ammonium ions having a substantially smaller ionic radius than that of lithium ions permeate through the film formed of the fluorinated benzene. Consequently, as described above, in the case where ammonium ions are present in the non-aqueous electrolyte solution of the non-aqueous electrolyte battery, ammonium ions are inserted into the interlayers of graphite serving as a negative electrode material to thereby break the layer structure of graphite when being charged. In the case where a non-aqueous electrolyte solution having a high concentration is utilized, the insertion of ammonium ions into the graphite interlayers is further increased, thereby breaking the graphite structure. For these reasons, in the non-aqueous electrolyte battery, a practical non-aqueous electrolyte solution containing a lithium salt and an ammonium salt dissolved in high concentrations has never been proposed.

With respect to the electric double layer capacitor, it is known that, in an electrolyte solution prepared by dissolving a quaternary ammonium salt in a non-aqueous solvent such as PC or BC and adding a fluorinated benzene, the fluorinated benzene substitutionally adsorbs moisture which is present in pores of activated carbon, thus facilitating discharge of a gas generated by application of a voltage (Patent Document 4). Unlike the non-aqueous electrolyte battery, the end potential of charging for the activated carbon negative electrode of the electric double layer capacitor is about from 1.8 to 2 V. The present inventors have intensively studied and confirmed that the highest reductive decomposition potential of the fluorinated benzene is about from 1.4 to 1.6 V relative to a lithium reference. Therefore, it was found that a film of fluorinated benzene is not formed on the surface of activated carbon by a conventional shallow charge in the electric double layer capacitor. Therefore, it has never been studied whether or not a film of fluorinated benzene has the permeability of ammonium ions in the electric double layer capacitor. Also, there has never been studied about the influence on characteristics using an electrolyte solution with a high concentration when being deeply charged in the same degree as that in the non-aqueous electrolyte battery.

Patent Document 1: Japanese Unexamined Patent Publication No. 2000-228222

Patent Document 2: Japanese Unexamined Patent Publication No. (HEI)11-329490

Patent Document 3: Japanese Unexamined Patent Publication No. 2002-110228

Patent Document 4: Japanese Unexamined Patent Publication No. 2004-6803

Non-Patent Document 1: Denkikagaku Binran (Handbook of Electrochemistry), p. 119, Table 3.32(a), $5^{th}$ edition (2000)

DISCLOSURE OF THE INVENTION

The present invention has been worked out in view of the above-mentioned problems, and an object thereof is to provide a non-aqueous electrolyte solution which can suppress the reductive decomposition of an electrolyte solution on a surface of activated carbon in an electric double layer capacitor even when a charging voltage is increased using the non-aqueous electrolyte solution, and also a non-aqueous electrolyte solution enabling formation of a film which can suppress the permeation of ammonium ions likely to cause the breakage of a layer structure of graphite and has a good permeability of lithium ions even when an electrolyte solution contains ammonium ions in a non-aqueous electrolyte battery using a negative electrode containing graphite, and to thus provide an electrochemical energy storage device having a high energy density.

An aspect of the present invention pertains to an electrochemical energy storage device comprising a negative electrode which contains a carbon material and has a negative electrode potential of 1.4 V or less relative to a lithium reference when being charged, and a non-aqueous electrolyte solution dissolving a lithium salt, an ammonium salt, and at least one kind of fluorinated benzene selected among hexafluorobenzene, pentafluorobenzene, 1,2,3,4-tetrafluorobenzene, 1,2,3,5-tetrafluorobenzene, 1,2,4,5-tetrafluorobenzene and 1,2,3-trifluorobenzene, in a non-aqueous solvent.

Objects, features, aspects and advantages of the present invention become more apparent from the following detailed description and accompanying drawings.

BRIEF DESCRIPTION OF THE DRAWINGS

FIG. 1 is a graph showing a change in a charge potential of a negative electrode in non-aqueous electrolyte batteries of Examples 1-1, 1-2, 1-3 and 1-6 as well as Comparative Examples 1-2 and 1-7 according to the present invention.

FIG. 2 is a graph showing a charging/discharging curve in a non-aqueous electrolyte battery of Example 1-1 according to the present invention.

FIG. 5 is a graph showing a change in a charge potential of a negative electrode in hybrid capacitors of Example 2 and Comparative Example 2 according to the present invention.

FIG. 6 is a graph showing a charging/discharging curve in hybrid capacitors of Example 2 and Comparative Example 2 according to the present invention.

BEST MODE FOR CARRYING OUT THE INVENTION

Figure 3:
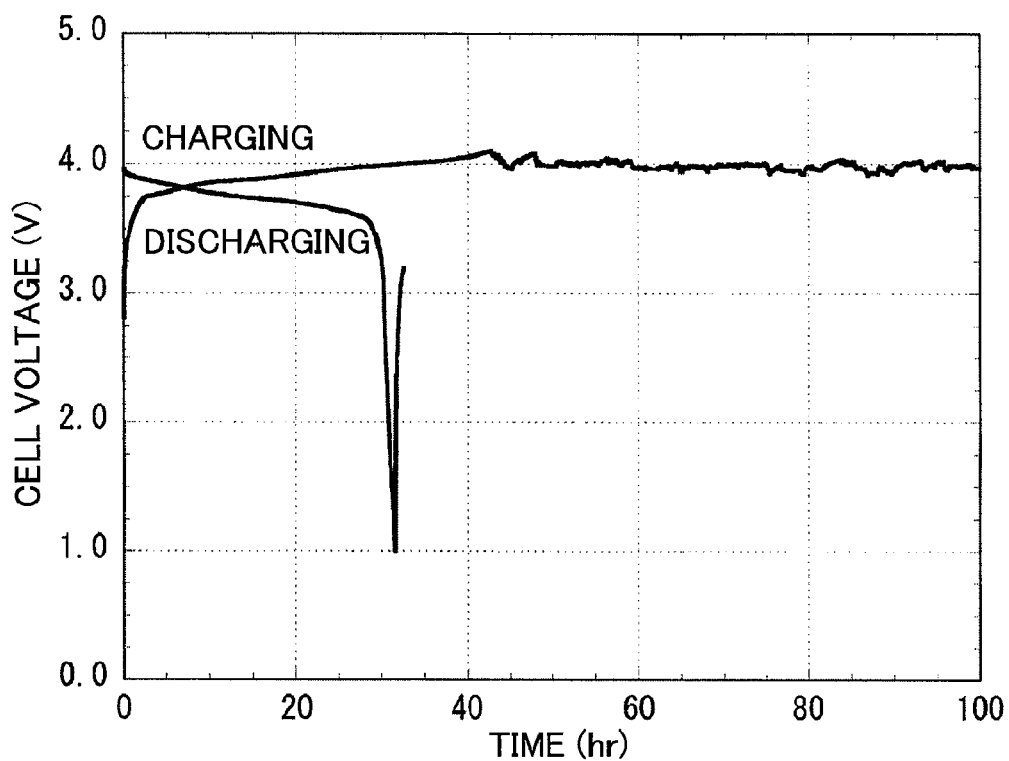
FIG. 3 is a graph showing a charging/discharging curve in a non-aqueous electrolyte battery of Comparative Example 1-2 according to the present invention.

A non-aqueous electrolyte solution according to an embodiment of the present invention is an electrolyte solution in which a lithium salt, an ammonium salt, and at least one kind of fluorinated benzene selected among hexafluorobenzene (hereinafter abbreviated to HFB), pentafluorobenzene (hereinafter abbreviated to PFB), 1,2,3,4-tetrafluorobenzene (hereinafter abbreviated to 1234TeFB), 1,2,3,5-tetrafluorobenzene (hereinafter abbreviated to 1235TeFB), 1,2,4,5-tetrafluorobenzene (hereinafter abbreviated to 1245TeFB) and 1,2,3-trifluorobenzene (hereinafter abbreviated to 123TrFB) are dissolved in a non-aqueous solvent.

It is preferred to use, as the non-aqueous electrolyte solution, a non-aqueous electrolyte solution containing a lithium salt and an ammonium salt in high concentrations, for example, the non-aqueous electrolyte solution in which a ratio of the content of the non-aqueous solvent to the total content of the lithium salt and the ammonium salt, [non-aqueous solvent/(lithium salt+ammonium salt), is from 1/2 to 4/1 in terms of a molar ratio.

The non-aqueous electrolyte solution having a high concentration preferably contains the lithium salt, the ammonium salt having a straight-chain alkyl group with 4 or less carbon atoms, and at least one kind of solvent selected among EC, PC, BC, γ-BL, DMC, EMC, DEC, dimethoxyethane (hereinafter abbreviated to DME), ethoxymethoxyethane (hereinafter abbreviated to EME) and diethoxyethane (hereinafter abbreviated to DEE) as the non-aqueous solvent.

As a result of the intensive study, the present inventors have found that, by using the ammonium salt and the non-aqueous solvents described above, the concentrations of dissolving lithium ions and ammonium ions can be remarkably increased in a non-aqueous electrolyte solution in which these ions coexist. Therefore, an electrochemical energy storage device having high energy density can be obtained by using such a non-aqueous electrolyte solution.

For example, when EC, $LiBF_4$ and trimethylpropylammonium tetrafluoroborate (hereinafter abbreviated to $TMPA.BF_4$) are mixed in a molar ratio ($EC/LiBF_4/TMPA.BF_4=2/1/1$), a non-aqueous electrolyte solution having a salt concentration of 4.5 moles/kg can be prepared. Surprisingly, whereas a mixture ($EC/LiBF_4=2/1$) is in a state like a wet crystal sugar, the mixture is converted into liquid at a normal temperature when mixed with a solid ammonium salt such as $TMPA.BF_4$, trimethylethylammonium tetrafluoroborate (hereinafter abbreviated to $TMEA.BF_4$) or $TEMA.BF_4$ which contains an ammonium ion having a straight-chain alkyl group with 4 or less carbon atoms as a cation. Therefore, the non-aqueous electrolyte solution having the above composition provides a non-aqueous electrolyte solution having a high concentration and a single phase. As the non-aqueous electrolyte solutions having such a high concentration, specifically, there are non-aqueous electrolyte solutions having the following compositions, for example.

$EC/LiBF_4/TMEA.BF_4=2/1/1$ $EC/LiBF_4/TMPA.BF_4=2/1/1$ $EC/LiBF_4/TEMA.BF_4=2/1/1$

In the above compositions, EC may be replaced by PC or γ-BL, and $BF_4^-$ of the lithium salt and the ammonium salt may be replaced by $ClO_4^-$ or a TFSI ion. Also, when a chain carbonate such as DMC, EMC or DEC is used as the non-aqueous solvent, it is preferred to use in combination with a cyclic carbonate such as EC or a cyclic ester such as γ-BL. In that case, the chain carbonate and another non-aqueous solvent are more preferably used in combination in a ratio of about 1/1.

In the non-aqueous electrolyte solution having a high concentration, a molar ratio of the lithium salt and the ammonium salt to be dissolved in the non-aqueous solvent is preferably from 1.0/0.6 to 0.6/1.0, and more preferably about 1/1, in a ratio of lithium salt to ammonium salt.

Examples of the lithium salt include $LiBF_4$ and LiTFSI, and also it is possible to use lithium salts such as $LiPF_6$, $LiClO_4$, lithiumbis[pentafluoroethanesulfonyl]imide (hereinafter abbreviated to LiBETI), lithium[trifluoromethanesulfonyl][nonafluorobutanesulfonyl]imide (hereinafter abbreviated to LiMBSI), lithium cyclohexafluoropropane-1,3-bis[sulfonyl]imide (hereinafter abbreviated to LiCHSI), lithiumbis[oxalate(2-)]borate (hereinafter abbreviated to LiBOB), lithium trifluoromethyl trifluoroborate (hereinafter abbreviated to $LiCF_3BF_3$), lithium pentafluoroethyltrifluoroborate (hereinafter abbreviated to $LiC_2F_5BF_3$), lithium heptafluoropropyl trifluoroborate (hereinafter abbreviated to $LiC_3F_7BF_3$), and lithium tris[pentafluoroethyl]trifluorophosphate [$Li(C_2F_5)_3PF_3$]. Of these lithium salts, at least one kind of lithium salt selected from the group consisting of LiTFSI, $LiPF_6$, $LiBF_4$, LiBETI, LiMBSI, LiCHSI, LiBOB, $LiCF_3BF_3$ and $LiC_2F_5BF_3$ is preferred.

The ammonium salt is preferably an ammonium salt containing a quaternary ammonium ion having a straight-chain alkyl group with 4 or less carbon atoms as a cation. An ammonium ion having a branched alkyl group is likely to be oxidized, while an ammonium ion having a straight-chain alkyl group with 5 or more carbon atoms makes it difficult to prepare a non-aqueous electrolyte solution having a high concentration. Furthermore, even if a film is formed on the surface of the negative electrode using the fluorinated benzene according to the present embodiment, an ammonium ion having a straight-chain alkyl group with 5 or more carbon atoms is likely to insert into graphite interlayers and break the graphite structure. Therefore, the ammonium ion is preferably an ammonium ion in which four groups binding to N (nitrogen) of the ammonium ion represent each independently a methyl group, an ethyl group, a n-propyl group, or a n-butyl group. Of these ammonium ions, for example, a quaternary ammonium ion having three or more methyl groups and a straight-chain alkyl group, such as a TMA ion, a trimethylethylammonium ion (hereinafter abbreviated to a TMEA ion), a trimethylpropylammonium ion (hereinafter abbreviated to a TMPA ion), a trimethylbutylammonium ion (hereinafter abbreviated to a TMBA ion), a trimethylpentylammonium ion (hereinafter abbreviated to a TMPeA ion), and a trimethylhexylammonium ion (hereinafter abbreviated to a TMHA ion) are preferred. The quaternary ammonium salts containing these quaternary ammonium ions may be used alone, or in a mixture of two or more.

Of these ammonium ions, for example, a non-aqueous electrolyte solution in which the ammonium salt having the TMPA ion as the ammonium ion is dissolved to have a composition of $EC/LiBF_4/TMPA.BF_4=1/1/1$ is particularly preferred because it is liquid at normal temperature to provide the highest concentration and has excellent reduction resistance.

Examples of the anion of the ammonium salt include, but are not limited to, a $BF_4^-$ ion, a $ClO_4^-$ ion, a TFSI ion, a $PF_6^-$ ion, a bis[pentafluoroethanesulfonyl]imide ion, a [trifluoromethanesulfonyl][nonafluorobutanesulfonyl]imide ion, a cyclohexafluoropropane-1,3-bis[sulfonyl]imide ion, a bis[oxalate(2-)]borate ion, a trifluoromethyltrifluoroborate ion ($CF_3BF_3^-$), a pentafluoroethyl trifluoroborate ion ($C_2F_5BF_3^-$), a heptafluoropropyl trifluoroborate ion, and a tris[pentafluoroethyl]trifluorophosphate ion. These anions are decomposed on a positive or negative electrode to form a stable film, thereby exerting an effect of improving charging and discharging cycle life of an electrochemical energy storage device.

The non-aqueous electrolyte solution according to the present embodiment contains, in addition to the non-aqueous solvent, the lithium salt and the ammonium salt described above, at least one kind of fluorinated benzene selected from the group consisting of HFB, PFB, 1234TeFB, 1235TeFB, 1245TeFB and 123TrFB. Such a fluorinated benzene is decomposed on the surface of the negative electrode when the charging potential of the negative electrode becomes 1.4 V or less, allows the ammonium ions and the lithium ions to be adsorbed on the surface of activated carbon without causing reductive decomposition of the electrolyte solution, and also suppresses ammonium ions from inserting into the graphite interlayers by forming a good film on any of the negative electrode materials which permeate lithium ions. Therefore, in the electric double layer capacitor, a gas is scarcely generated even if a charging voltage is set to a higher value. In the non-aqueous electrolyte battery, the breakage of the graphite structure and the decomposition of the ammonium ions are suppressed. Thus, high discharge capacity can be obtained in both devices.

A content of the fluorinated benzene in the non-aqueous electrolyte solution may be appropriately selected according to a kind of the used fluorinated benzene and is not specifically limited. For example, a molar ratio of the content of the fluorinated benzene and the total content of the non-aqueous solvent, the lithium salt and the ammonium salt, ((non-aqueous solvent+lithium salt+ammonium salt)/fluorinated benzene), is preferably from 4/0.01 to 4/0.5. When the molar ratio is within the above range, it is possible to obtain a non-aqueous electrolyte solution in which the fluorinated benzene is sufficiently dissolved. The content of the fluorinated benzene in the present embodiment is preferably from 0.01 to 0.5 moles based on 1 mole of the ammonium salt. Controlling the content of the fluorinated benzene to 0.01 moles or more enables the formation of a film of the fluorinated benzene, and thus the effect of suppressing reductive decomposition of the electrolyte solution is exerted. Increasing the content of the fluorinated benzene to about 0.5 moles decreases the viscosity of the electrolyte solution, whereby the load characteristics of the electrochemical energy device can be improved.

To the non-aqueous electrolyte solution, a cyclic or a chain carbonate having a C═C unsaturated bond may be further added as the non-aqueous solvent. Since a good film is formed on the surface of the negative electrode by the addition of these carbonates, the charging and discharging cycle characteristics of the electrochemical energy device can be improved. In view of maintaining a high ion concentration, the amount of these other non-aqueous solvents to be added in the non-aqueous electrolyte solution is preferably less than the total molar amount of the above-described non-aqueous solvent for obtaining the non-aqueous electrolyte solution having a high concentration.

Examples of the cyclic carbonate having a C═C unsaturated bond include vinylene carbonate (hereinafter abbreviated to VC), vinylethylene carbonate (hereinafter abbreviated to Vec), divinylethylene carbonate (hereinafter abbreviated to DVec), phenylethylene carbonate (hereinafter abbreviated to Pec) and diphenylethylene carbonate (hereinafter abbreviated to DPec). In particular, Vec and Pec are preferable.

Examples of the chain carbonate having a C═C unsaturated bond include methylvinyl carbonate (hereinafter abbreviated to MVC), ethylvinyl carbonate (hereinafter abbreviated to EVC), divinyl carbonate (hereinafter abbreviated to DVC), allylmethyl carbonate (hereinafter abbreviated to AMC), allylethyl carbonate (hereinafter abbreviated to AEC), diallyl carbonate (hereinafter abbreviated to DAC), allylphenyl carbonate (hereinafter abbreviated to APC) and diphenyl carbonate (hereinafter abbreviated to DPC). In particular, DAC, APC and DPC are preferable.

The carbon material used in the negative electrode for the electric double layer capacitor includes activated carbon. Specific examples of the activated carbon include activated carbon based on natural plant such as coconut shell; activated carbon based on synthetic resin such as phenol; and activated carbon based on fossil fuel such as coke; and these activated carbons may be used alone or in combination. Also, ultrafine powdered activated carbon obtained by activating carbon black may be used. The carbon material used for the non-aqueous electrolyte battery includes, for example, graphite. Specific examples of the graphite include natural graphite, artificial graphite, and a high crystalline carbon material having a pseudo-graphite structure. The high crystalline carbon material includes, for example, mesophase pitch-based graphite fiber, graphited mesocarbon microbeads, vapor-grown carbon fiber, and graphite whisker. These graphites may be used alone or in combination. Another carbon material includes a single- or multi-layered nanotube. Of these carbon materials for the non-aqueous electrolyte battery, natural graphite or artificial graphite is preferred because the potential of the negative electrode can be made lowest. Also, since the non-aqueous electrolyte solution of the present embodiment can form a good film on the activated carbon and graphite, these carbon materials can be used for the negative electrode containing both the materials as the negative electrode material. When such a mixed type negative electrode is used, while the activated carbon in the same negative electrode can adsorb ammonium ions and lithium ions without causing decomposition of the electrolyte solution and thus energy can be stored, the graphite serves to suppress the insertion of ammonium ions and facilitate the insertion of lithium ions thereinto. Thus, an electrochemical energy storage device having excellent high rate characteristics and high capacity can be obtained.

As the positive electrode, a conventionally known positive electrode containing a positive electrode material can be used. Specific examples of the positive electrode material for the electric double layer capacitor include, in addition to the same activated carbon as used in the negative electrode, conductive compounds such as polypyrrole or polythiophene capable of inserting or extracting anions when being charged or discharged. These positive electrode materials may be used alone, or two or more kinds of them may be used in combination. As the positive electrode material for the non-aqueous electrolyte battery, for example, lithium complex oxides such as lithium cobaltate, lithium nickelate, lithium maganate, and lithium iron phosphate can be used. Among the above positive electrode materials, a mixed positive electrode containing the lithium complex oxide and the activated carbon as the positive electrode materials is preferred because it has both the functions as an electric double layer capacitor and as a non-aqueous electrolyte battery.

The electrochemical energy storage device according to the present embodiment is charged until the charging potential of the negative electrode becomes 1.4 V or less when being charged. By charging up to the above negative potential or less, deep charging is conducted, making it possible to set the charging potential to a higher value. When the negative electrode potential becomes a low potential of 1.4 V or less, the specific fluorinated benzene is decomposed on the surface of the negative electrode to form a good film. Thus, high energy density can be achieved even in the case where the device comprises a negative electrode containing any carbon material of activated carbon and graphite as the negative electrode material. The negative electrode potential when being charged is 1.4 V or less, preferably 1.1 V or less, and more preferably 0.9 V or less, relative to a lithium reference, and the lower limit is the lithium potential (0.05 V).

While the embodiments of the present invention have been described in detail, the embodiments are an exemplary of the invention in the aspects, and the present invention is not limited to the embodiments. It should be understood that numerous modifications that are not illustrated can be made without departing from the scope of the present invention.

Examples of the present invention will now be described hereinafter, but the present invention is not limited to the following examples.

EXAMPLES

Example 1 and Comparative Example 1

Using $LiCoO_2$ as a positive electrode material which inserts or extracts lithium ions when being charged or discharged, and using an artificial graphite as a negative electrode material, a non-aqueous electrolyte battery was assembled in the following manner and then evaluated.

First, 93 parts by mass of a $LiCoO_2$ powder, 3 parts by mass of acetylene black as a conductive agent and 4 parts by mass of a polyvinylidene fluoride resin as a binder were mixed. This mixture was dispersed in dehydrated N-methyl-2-pyrrolidone to prepare a slurry-like positive electrode mixture. The positive electrode mixture was applied on a positive electrode current collector made of an aluminum foil having a thickness of 15 μm, dried and then rolled to form a positive electrode active material layer having a thickness of 63 μm. Next, the positive electrode current collector holding the positive electrode active material layer thereon was cut into pieces measuring 35 mm×35 mm. A 0.5 mm thick aluminum current collecting plate with a lead was ultrasonic-welded to the positive electrode current collector to produce a positive electrode plate.

Next, 98 parts by mass of an artificial graphite powder, 1 part by mass of a styrene-butadiene rubber as a binder and 1 part by mass of a carboxymethyl cellulose resin as a thickener were mixed in a state of an aqueous paste to prepare a negative electrode mixture. This negative electrode mixture was applied on a 10 μm thick negative electrode current collector made of copper, dried and then rolled to form a negative electrode active material layer having a thickness of 64 μm. Next, the negative electrode current collector holding the negative electrode active material layer thereon was cut into pieces measuring 35 mm×35 mm. A 0.5 mm thick copper current collecting plate with a lead was ultrasonic-welded to the negative electrode current collector to produce a negative electrode plate.

A small piece of a nickel expanded metal was spot-welded with the tip of the lead to produce a reference electrode in which a lithium metal foil is contact-bonded to the expanded metal portion.

Separately, EC, $LiBF_4$, TMPA-$BF_4$ and each fluorinated benzene shown in Table 1 were mixed in a molar ratio (EC/$LiBF_4$/TMPA.$BF_4$/fluorinated benzene=2/1/1/0.1) to prepare each non-aqueous electrolyte solution. It was confirmed that the lithium salt and the ammonium salt are dissolved in high concentration in each non-aqueous electrolyte solution and all of the non-aqueous electrolyte solutions are in the form of a single phase at a room temperature. In Table 1, the symbol 124TrFB denotes 1,2,4-trifluorobenzene, 135TrFB denotes 1,3,5-trifluorobenzene, 12DFB denotes 1,2-difluorobenzene, 13DFB denotes 1,3-difluorobenzene, 14DFB denotes 1,4-difluorobenzene, and MFB denotes monofluorobenzene.

After the positive and negative electrodes produced above were disposed opposite to each other via a nonwoven fabric made of polypropylene, the positive and negative electrodes were fixed with a tape and then integrated to produce an electrode body. This electrode body was encased in a cylindrical aluminum laminate bag having an opening at both ends and, after the reference electrode was inserted into the gap between the electrode body and the laminate bag, one opening portion of the bag was fusion-bonded at the lead portion of both electrodes and the reference electrode. Next, the non-aqueous electrolyte solution prepared above was dripped through the other opening portion. After dripping, deaeration was conducted under 1,300 Pa (10 mmHg) for 5 seconds. The other opening portion was sealed by fusion bonding to produce a non-aqueous electrolyte battery.

With respect to each non-aqueous electrolyte battery thus assembled, charging and discharging were conducted at an atmospheric temperature of 20° C. and a current density of 0.03 mA/cm². In a first cycle, charging was conducted for 20 hours and then discharging was conducted until a battery voltage becomes 1 V. In a second cycle, charging was conducted until a battery voltage becomes 4.2 V and then discharging was conducted until a battery voltage becomes 1V. The discharge capacity at the second cycle of each non-aqueous electrolyte battery is shown in Table 1. Also, the change in the potential of the negative electrode at a first cycle in the non-aqueous electrolyte batteries when being charged, in which HFB, PFB, 1234TeFB, 123TrFB or 135TrFB is added, or any fluorinated benzene is not added, is shown in FIG. 1.

TABLE 1

| | Fluorinated benzene | Discharge capacity (mAh) |
|---|---|---|
| Example 1-1 | HFB | 32.4 |
| Example 1-2 | PFB | 30.4 |
| Example 1-3 | 1234TeFB | 30.9 |
| Example 1-4 | 1235TeFB | 30.5 |
| Example 1-5 | 1245TeFB | 30.2 |
| Example 1-6 | 123TrFB | 30.0 |
| Comparative Example 1-1 | 124TrFB | 24.1 |
| Comparative Example 1-2 | 135TrFB | 11.2 |
| Comparative Example 1-3 | 12DFB | 23.6 |
| Comparative Example 1-4 | 13DFB | 4.3 |
| Comparative Example 1-5 | 14DFB | 22.8 |
| Comparative Example 1-6 | MFB | 22.2 |
| Comparative Example 1-7 | None | 20.3 |

As shown in Table 1, the non-aqueous electrolyte batteries of Examples 1-1 to 1-6, in which a non-aqueous electrolyte solution containing a specific fluorinated benzene is used, enables the achievement of a higher discharge capacity than that of the non-aqueous electrolyte batteries of Comparative Examples 1-1 to 1-7 which contains no fluorinated benzene, or contains a fluorinated benzene including 2 or less fluorine atoms, or contains a fluorinated benzene including 3 or more fluorine atoms substituted on different positions. Therefore, it is found that, in the non-aqueous electrolyte solution containing a specific fluorinated benzene, the insertion of the ammonium ions into the graphite interlayers is suppressed and the lithium ions are satisfactorily inserted even if the lithium salt and the ammonium salt are dissolved in high concentration in the non-aqueous electrolyte solution.

As shown in FIG. 1, the non-aqueous electrolyte solution, each containing HFB, PFB, 1234TeFB, or 123TrFB, has a potential region, in which each potential remains in a flat level, respectively at about 1.4 V, about 1.25 V, about 1.1 V, or about 0.9 V, and each potential change attributed to the decomposition of the fluorinated benzene added in the non-aqueous electrolyte solution was confirmed. Further, it was confirmed that the non-aqueous electrolyte batteries of Examples each containing another fluorinated benzene have the potential region in which each potential similarly remains in a flat level, although plotting was omitted so as to prevent a complicated drawing. Also, an equilibrium potential of the negative electrode in these non-aqueous electrolyte batteries after the completion of charging for 20 hours is about 0.2 V, which shows the production of a lithium graphite intercalation compound of a third stage structure (structure in which three graphite layers and one lithium layer are alternately stacked on each other). It was confirmed from the above results that the fluorinated benzene of the present embodiment is decomposed when the charging potential of the negative electrode becomes 1.4 V or less to form on the surface of the negative electrode a good quality film which permeates lithium ions and does not permeate ammonium ions. To the contrary, in the non-aqueous electrolyte batteries of Comparative Examples 1-2 and 1-7, it was confirmed that the graphite structure is broken because the negative electrode potential rapidly decreases at the initial stage of charging. Also in the non-aqueous electrolyte batteries of the Comparative Examples, since the negative electrode potential decreased to about 0.1 V upon completion of charging, it is considered that not only ammonium ions, but also lithium ions were inserted between graphite interlayers. However, as is apparent from the discharge capacity shown in Table 1, lithium ions capable of contributing to the electrochemical reaction decrease as a result of the breakage of the graphite structure.

Figure 4:
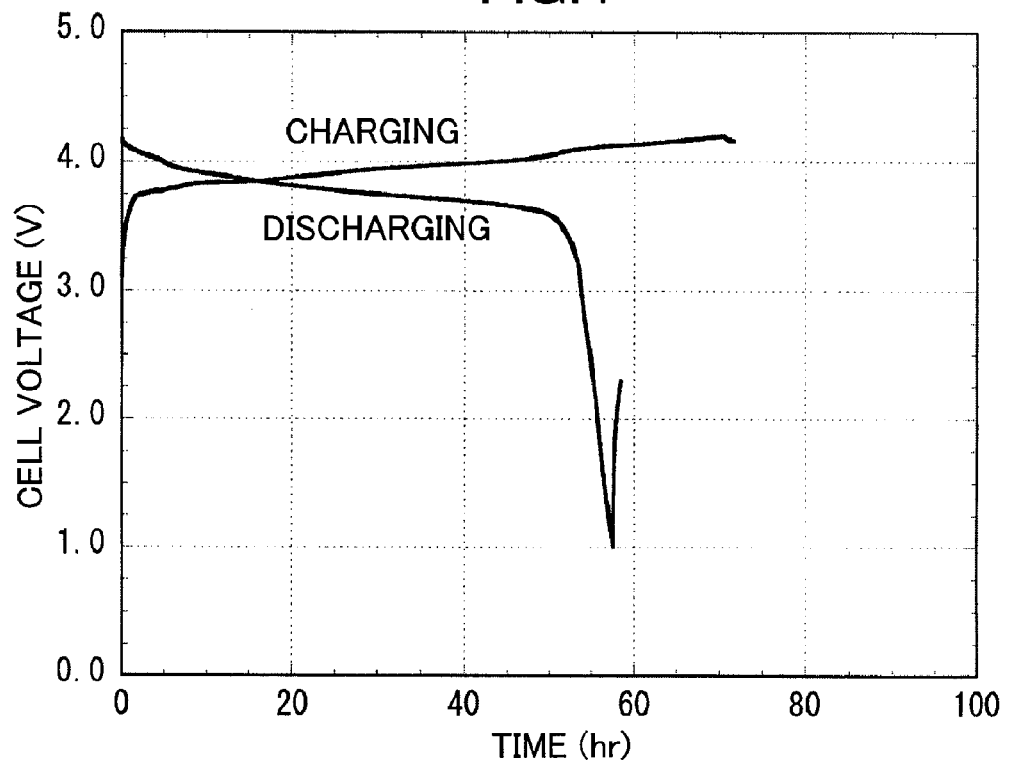
FIG. 4 is a graph showing a charging/discharging curve in a non-aqueous electrolyte battery of Comparative Example 1-7 according to the present invention.

FIG. 2 is a plotted graph showing a charging-discharging curve in a second cycle of the non-aqueous electrolyte battery of Example 1-1 in which the non-aqueous electrolyte solution containing HFB is used, FIG. 3 is a plotted graph showing a charging-discharging curve in a second cycle of the non-aqueous electrolyte battery of Comparative Example 1-2 in which the non-aqueous electrolyte solution containing 135TrFB is used, and FIG. 4 is a plotted graph showing a charging-discharging curve in a second cycle of the non-aqueous electrolyte battery of Comparative Example 1-7 in which no fluorinated benzene is contained.

As is apparent from the charging-discharging curve shown in FIG. 2, satisfactory charging and discharging characteristics are obtained in the non-aqueous electrolyte battery in which the non-aqueous electrolyte solution containing HFB is used, and neither the breakage of a graphite structure due to TMPA ions, nor the behavior indicating decomposition of TMPA ions is observed.

To the contrary, in the non-aqueous electrolyte battery in which the non-aqueous electrolyte solution containing 135TrFB is used, as shown in FIG. 3, it became impossible to charge after 40 hours have passed since the beginning of charging. This is because, as observed in FIG. 1, the graphite structure was broken due to the insertion of the TMPA ions into the graphite interlayers and electrical short circuiting between the positive electrode and the negative electrode was caused by the collapsed fine powders of graphite. In the non-aqueous electrolyte battery in which the non-aqueous electrolyte solution containing no fluorinated benzene is used, as shown in FIG. 4, charging could be conducted. However, as shown in Table 1, the charge capacity is only about 60% of that of the non-aqueous electrolyte battery of Example 1-1. This is because the number of sites capable of accommodating lithium ions between the layers decreased due to the insertion of the TMPA ions into the graphite interlayers, similarly to the case of 135TrFB. Another cause can be taken into account that the electrolyte solution has a high viscosity and various overvoltages increase since the electrolyte solution does not contain the fluorinated benzene such as HFB.

Example 2

Using a positive electrode material used in a non-aqueous electrolyte battery as a positive electrode and using a polarizable material used in an electric double layer capacitor as a negative electrode, a hybrid capacitor was assembled in the following manner and then evaluated.

First, in the same manner as in Example 1, a positive electrode plate having a size of 35 mm×35 mm, in which $LiCoO_2$ is used as the positive electrode material, was produced.

Next, an activated carbon electrode for electric double layer capacitor manufactured by Hohsen Kabushikikaisha was processed to form a negative electrode plate having a size of 35 mm×35 mm.

As the reference electrode, the same lithium metal foil as in Example 1 was used.

Besides, EC, $LiBF_4$, $TMPA.BF_4$ and HFB were mixed in a molar ratio ($EC/LiBF_4/TMPA.BF_4/HFB=2/1/1/0.1$) to prepare a non-aqueous electrolyte solution.

After the positive and negative electrodes produced above were disposed opposite to each other via a nonwoven fabric made of polypropylene, the positive and negative electrodes were fixed with a tape and then integrated to produce an electrode body. This electrode body was encased in a cylindrical aluminum laminate bag having an opening at both ends and, after the reference electrode was inserted into the gap between the electrode body and the laminate bag, one opening portion of the bag was fusion-bonded at the lead portion of both electrodes and the reference electrode. Next, the non-aqueous electrolyte solution prepared above was dripped through the other opening portion. After dripping, deaeration was conducted under 1,300 Pa (10 mmHg) for 5 seconds. The other opening portion was sealed by fusion bonding to produce a hybrid capacitor.

Comparative Example 2

In the same manner as in Example 2, except that HFB was not added to a non-aqueous electrolyte solution, a hybrid capacitor was produced.

With respect to each hybrid capacitor thus assembled, charging and discharging were conducted at an atmospheric temperature of 20° C. and a current density of 0.03 $mA/cm^2$. Regarding the cell voltage, the upper limit voltage was 3.6 V and the lower limit voltage was 0 V. A gas stored in each hybrid capacitor after 10 cycles was collected, and then the measurement of the volume and the analysis of the composition were conducted. The potential of the negative electrode when being charged is shown in FIG. 5, the charging-discharging curve is shown in FIG. 6, and the amounts of gases generated are shown in Table 2.

TABLE 2

| | $H_2$ | CO | $CO_2$ | $C_2H_4$ | Total |
|---|---|---|---|---|---|
| Example 2 | 0.00 | 0.02 | 0.00 | 0.18 | 0.20 |
| Comparative Example 2 | 0.01 | 0.16 | 0.01 | 0.77 | 0.95 |

(Unit: ml)

As is apparent from FIG. 5, in the hybrid capacitor of Example 2 in which the non-aqueous electrolyte solution containing HFB is used, a potential change attributed to the decomposition of the fluorinated benzene was confirmed in the potential region of about 1.6 V or less. It was found that an equilibrium potential after the completion of charging for 23 hours was about 0.8 V, which shows that the charging of the double layer occurred up to the deep potential.

On the other hand, in the non-aqueous electrolyte solution of Comparative Example 2 in which a non-aqueous electrolyte solution containing no fluorinated benzene is used, the potential smoothly decreased to about 0.5 V.

As is apparent from FIG. 6, the hybrid capacitor of Example 2 in which the non-aqueous electrolyte solution containing HFB is used has more excellent charging and discharging characteristics than those of the hybrid capacitor of Comparative Example 2 in which the non-aqueous electrolyte solution containing no fluorinated benzene is used. The discharge capacity at the tenth cycle was 1.0 mAh in the case of Example 2, and was 0.87 mAh in the case of Comparative Example 2.

As shown in Table 2, with respect to the gas generated in the hybrid capacitor after 10 cycles, gases other than $C_2H_4$ were scarcely generated in the hybrid capacitor of Example 2 and the total amount of the gases was as small as 0.20 ml. Therefore, the hybrid capacitor of Example 2 did not largely expand as a result of charging and discharging. In contrast, in the hybrid capacitor of Comparative Example 2, although the gas generated was mainly composed of $C_2H_4$, a multitude of gases containing another component were generated, and the total amount of the gas was as large as 0.95 ml. Therefore, the hybrid capacitor of Comparative Example 2 expanded largely as a result of charging and discharging.

As described above, in both the non-aqueous electrolyte battery comprising the negative electrode containing graphite and the electric double layer capacitor comprising the negative electrode containing activated carbon, the non-aqueous electrolyte solution according to the embodiment of the present invention enables formation of a film which does not permeate ammonium ions but permeates lithium ions with respect to the graphite, and also enables formation of a film which can allow ammonium ions and lithium ions to adsorb without causing reductive decomposition of the electrolyte solution with respect to the activated carbon, even though the lithium salt and the ammonium salt are dissolved in the high concentration. Therefore, in the electrochemical energy storage device comprising the negative electrode containing the carbon material, the high energy density can be achieved.

In Examples 1 and 2, one fluorinated benzene was mixed in the electrolyte solution. As a matter of course, a similar effect can be obtained even if a plurality of fluorinated benzenes are mixed. Although non-aqueous electrolyte solutions having a high concentration were used in the Examples, the present embodiment can also be applied to non-aqueous electrolyte solutions having a low concentration. Furthermore, the respective electrodes of Examples 1 and 2 are illustrative and, for example, by adjusting the amounts of $LiCoO_2$ and acetylene black in the positive electrode of Example 2, and the amount of activated carbon in the negative electrode, the capacity of the hybrid capacitor and the characteristics of the charging-discharging curve can be optimized.

As described in detail hereinabove, an aspect of the present invention pertains to an electrochemical energy storage device comprising a negative electrode which contains a carbon material and has a negative electrode potential of 1.4 V or less relative to a lithium reference when being charged, and a non-aqueous electrolyte solution dissolving a lithium salt, an ammonium salt, and at least one kind of fluorinated benzene selected among hexafluorobenzene, pentafluorobenzene, 1,2,3,4-tetrafluorobenzene, 1,2,3,5-tetrafluorobenzene, 1,2,4,5-tetrafluorobenzene and 1,2,3-trifluorobenzene in a non-aqueous solvent. With the above configuration, in the electrochemical energy storage device in which the carbon material enabling a low charging potential of the negative electrode of 1.4 V or less is used as a negative electrode material, since the above specific fluorinated benzene forms a favorable film on the surface of the negative electrode, the ammonium ions and the lithium ions are allowed to be adsorbed without causing the decomposition of the electrolyte solution on the surface of activated carbon and the insertion of the ammonium ions into the graphite interlayers is suppressed even when the electrolyte solution having a high concentration is used, ensuring the smooth insertion of the lithium ions into the graphite interlayers.

The carbon material is preferably at least one kind of carbon material selected from the group consisting of graphite and activated carbon. With the above configuration, since a low negative electrode potential is obtained when being charged, the film of the fluorinated benzene is formed on the surface of the negative electrode. Also, since a high charging potential can be set, the electrochemical energy storage device having a high energy density can be obtained.

The above ammonium salt is preferably an ammonium salt containing a quaternary ammonium ion having a straight-chain alkyl group with 4 or less carbon atoms as a cation. With the above configuration, the permeation of the ammonium ions when being charged can be effectively suppressed by the film of the fluorinated benzene formed on the surface of the negative electrode.

Furthermore, the cation of the ammonium salt is preferably a quaternary ammonium ion having three or more methyl groups and a straight-chain alkyl group with 4 or less carbon atoms. With the above configuration, not only the permeation of the ammonium ions when being charged can be effectively suppressed, but also the non-aqueous electrolyte solution containing a high concentration of the ammonium salt dissolved therein can be obtained.

Particularly, the cation of the ammonium salt is preferably a trimethylpropylammonium ion. With the above configuration, the non-aqueous electrolyte solution having a remarkably high concentration can be obtained and also the non-aqueous electrolyte solution having excellent reduction resistance can be obtained.

The cation of the ammonium salt is preferably a quaternary ammonium ion having a straight-chain alkyl group with 4 or less carbon atoms, and the non-aqueous solvent is preferably at least one kind selected from the group consisting of ethylene carbonate, propylene carbonate, butylene carbonate, γ-butyrolactone, dimethyl carbonate, ethylmethyl carbonate, diethyl carbonate, dimethoxyethane, ethoxymethoxyethane, and diethoxyethane. With the above configuration, the non-aqueous electrolyte solution containing the lithium salt and the ammonium salt dissolved in high concentrations therein can be obtained.

In particular, in the case where the lithium salt is lithium tetrafluoroborate, the ammonium salt is trimethylpropylammonium tetrafluoroborate, and the non-aqueous solvent is ethylene carbonate, the non-aqueous electrolyte solution having a high concentration and an excellent reduction resistance can be obtained.

The ratio of the content of the non-aqueous solvent to the total content of the lithium salt and the ammonium salt in the non-aqueous electrolyte solution, (non-aqueous solvent/(lithium salt+ammonium salt)), is preferably from 1/2 to 4/1 in terms of a molar ratio. With the above configuration, even in the non-aqueous electrolyte solution with the high concentration in which the contents of the lithium salt and the ammonium salt in the electrolyte solution are increased to enhance the energy density, the decomposition of the electrolyte solution on the surface of the activated carbon can be suppressed and also the insertion of the ammonium ions into the graphite interlayers can be suppressed.

The ratio of the content of the lithium salt to the content of the ammonium salt in the non-aqueous electrolyte solution, (lithium salt/ammonium salt), is preferably from 1.0/0.6 to 0.6/1.0 in terms of a molar ratio. With the above configuration, the contents of the lithium salt and the ammonium salt in the electrolyte solution can be increased.

Furthermore, the ratio of the total content of the non-aqueous solvent, the lithium salt and the ammonium salt to the content of the fluorinated benzene in the non-aqueous electrolyte solution, ((non-aqueous solvent+lithium salt+ammonium salt)/fluorinated benzene), is preferably from 4/0.01 to 4/0.5 in terms of a molar ratio. With the above configuration, the non-aqueous electrolyte solution containing the fluorinated benzene dissolved sufficiently therein can be obtained and also the reductive decomposition of the electrolyte solution can be effectively suppressed by the formed film of the fluorinated benzene.

INDUSTRIAL APPLICABILITY

Since the electrochemical energy storage device of the present invention comprises a negative electrode which contains a carbon material and has a negative electrode charge potential of 1.4 V or less relative to a lithium reference, a fluorinated benzene contained in a non-aqueous electrolyte solution forms a film on a surface of the negative electrode when deeply charged. By the formation of the film, in case of using activated carbon as a negative electrode material, the reductive decomposition is suppressed even if a set voltage when being charged is high. Also, by the formation of the film, in case of using graphite as the negative electrode material, the permeation of the ammonium ions when being charged is suppressed without causing the breakage of the layer structure of graphite and the satisfactory permeation of the lithium ions is ensured. Thus, the high energy density can be achieved in the electrochemical energy storage device comprising the negative electrode containing any carbon material of the activated carbon and the graphite.

The invention claimed is:

1. An electrochemical energy storage device comprising:
a negative electrode which contains a carbon material and has a negative electrode potential of 1.4 V or less relative to a lithium reference when being charged; and
a non-aqueous electrolyte solution dissolving a lithium salt, an ammonium salt, and at least one kind of fluorinated benzene selected among hexafluorobenzene, pentafluorobenzene, 1,2,3,4-tetrafluorobenzene, 1,2,3,5-tetrafluorobenzene, 1,2,4,5-tetrafluorobenzene and 1,2,3-trifluorobenzene, in a non-aqueous solvent,
wherein the ammonium salt is an ammonium salt containing a quaternary ammonium ion having a straight-chain alkyl group with 4 or less carbon atoms as a cation, and
a ratio of the content of the non-aqueous solvent to the total content of the lithium salt and the ammonium salt in the non-aqueous electrolyte solution, (non-aqueous solvent/(lithium salt+ammonium salt)), is from 1/2 to 4/1 in terms of a molar ratio.

2. The electrochemical energy storage device according to claim 1, wherein the carbon material is at least one kind of carbon material selected from the group consisting of graphite and activated carbon.

3. The electrochemical energy storage device according to claim 1, wherein the cation of the ammonium salt is a quaternary ammonium ion having three methyl groups and a straight-chain alkyl group with 4 or less carbon atoms.

4. The electrochemical energy storage device according to claim 3, wherein the cation of the ammonium salt is a trimethylpropylammonium ion.

5. The electrochemical energy storage device according to claim 1, wherein the cation of the ammonium salt is a quaternary ammonium ion having a straight-chain alkyl group with 4 or less carbon atoms, and the non-aqueous solvent is at least one selected from the group consisting of ethylene carbonate, propylene carbonate, butylene carbonate, γ-butyrolactone, dimethyl carbonate, ethylmethyl carbonate, diethyl carbonate, dimethoxyethane, ethoxymethoxyethane, and diethoxyethane.

6. The electrochemical energy storage device according to claim 1, wherein the lithium salt is lithium tetrafluoroborate, the ammonium salt is trimethylpropylammonium tetrafluoroborate, and the non-aqueous solvent is ethylene carbonate.

7. The electrochemical energy storage device according to claim 1, wherein a ratio of the content of the non-aqueous solvent to the total content of the lithium salt and the ammonium salt in the non-aqueous electrolyte solution, (non-aqueous solvent/(lithium salt+ammonium salt)), is from 1/2 to 1/1 in terms of a molar ratio.

8. The electrochemical energy storage device according to claim 1, wherein a ratio of the content of the lithium salt to the content of the ammonium salt in the non-aqueous electrolyte solution, (lithium salt/ammonium salt), is from 1.0/0.6 to 0.6/1.0 in terms of a molar ratio.

9. The electrochemical energy storage device according to claim 1, wherein a ratio of the total content of the non-aqueous solvent, the lithium salt and the ammonium salt to the content of the fluorinated benzene in the non-aqueous electrolyte solution, ((non-aqueous solvent+lithium salt+ammonium salt)/fluorinated benzene), is from 4/0.01 to 4/0.5 in terms of a molar ratio.

\* \* \* \* \*